(12) United States Patent
Wick et al.

(10) Patent No.: US 8,484,182 B1
(45) Date of Patent: Jul. 9, 2013

(54) WIRELESS DEVICE CONTENT SEARCHING

(75) Inventors: Ryan Wick, Apollo Beach, FL (US);
Raymond Emilio Reeves, Olathe, KS (US); Wen Xue, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 125 days.

(21) Appl. No.: 13/014,133

(22) Filed: Jan. 26, 2011

(51) Int. Cl.
*G06F 17/30* (2006.01)

(52) U.S. Cl.
USPC ............ 707/706; 707/741; 707/783; 709/217

(58) Field of Classification Search
USPC ............................ 707/706, 741, 783; 709/217
See application file for complete search history.

(56) References Cited

U.S. PATENT DOCUMENTS

| | | |
|---|---|---|
| 2007/0130370 A1 | 6/2007 | Akaezuwa |
| 2008/0052370 A1 | 2/2008 | Snyder |

*Primary Examiner* — Huawen Peng

(57) ABSTRACT

A system and method of searching data stored on a wireless device is provided. Using a search request to search data stored on a wireless device which is received at a first processing node from a second processing node, the first processing node performs a search of the data stored on the wireless device. Search results are generated at the first processing node based on the search, and the search results are provided from the first processing node to the second processing node.

15 Claims, 8 Drawing Sheets

WIRELESS DEVICE CONTENT SEARCHING

TECHNICAL BACKGROUND

The ubiquity of digital computing platforms has facilitated the creation of a vast amount of digital content. Such platforms include computers, cell phones, smart phones, digital cameras and other image forming devices, digital audio recording devices, and an array of other platforms which enable the creation of documents, images, video, audio, and other embodiments of information in digital form. Much of this information can be made available through computer networks and internetworks. An effective way to identify and locate desired information on a computing platform, and especially on a network or internetwork, is through some form of search.

Wireless devices may connect to a network or internetwork, and may store such data as described above. However, searching data stored on a wireless device can consume network resources, such as air interface resources, network bandwidth, and processor load. Furthermore, searching data stored on a wireless device can rapidly deplete a wireless device battery.

Overview

Systems and methods of searching data stored on a wireless device are provided. Using a search request to search data stored on a wireless device which is received at a first processing node from a second processing node, the first processing node performs a search of the data stored on the wireless device. Search results are generated at the first processing node based on the search, and the search results are provided from the first processing node to the second processing node.

DETAILED DESCRIPTION

Figure 1:
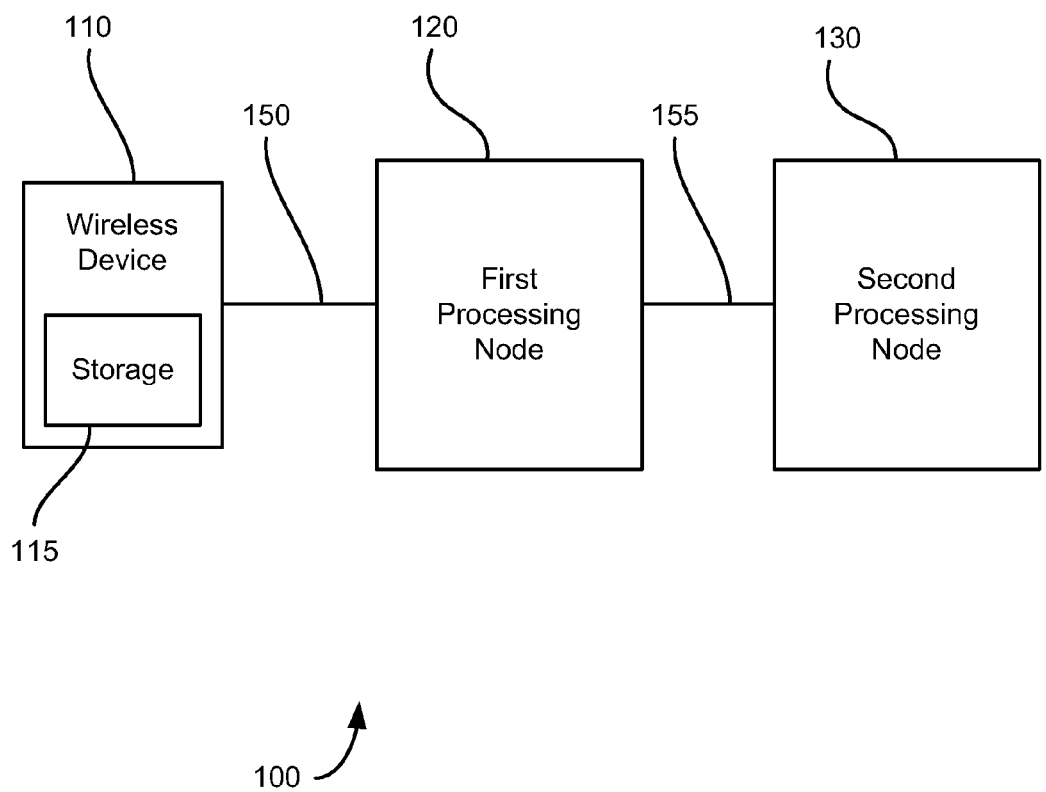
FIG. 1 illustrates an exemplary communication system to search data stored on a wireless device.

FIG. 1 illustrates an exemplary communication system 100 to search data stored on a wireless device. Communication system 100 comprises wireless device 110, a first processing node 120, and a second processing node 130. The wireless device 110 may further comprise storage 115 to store data. Examples of a wireless device 110 can include a telephone, a computer, a personal digital assistant, an internet access device, or other device capable of wireless communication and the storage of data, including combinations thereof. Storage 115 can be, for example, a disk drive, flash drive, memory circuitry, or some other memory device, in various forms of volatile and non-volatile memory storage. The wireless device 110 can store a wide variety of data. For example, the wireless device 110 may store documents, spreadsheets, presentations, interpersonal contact information, calendar information, and electronic mail files. The wireless device 110 may also store digital photographs, video files, and audio files including music and voice message files. The wireless device 110 may also store various software applications and associated data in storage 115. In short, the wireless device 110 can store a wide variety of data embodied in electronic form.

First processing node 120 is in communication with the wireless device 110 through communication link 150. First processing node 120 can be any network element capable of communicating with the wireless device 110, and can comprise a processor and associated circuitry to transmit a search request to and receive a response to the search request from the wireless device 110. First processing node 120 can retrieve and execute software from storage, which can include a disk drive, flash drive, memory circuitry, or some other memory device. The software comprises computer programs, firmware, or some other form of machine-readable instructions, and may include an operating system, utilities, drivers, network interfaces, applications, or some other type of software. The first processing node also includes a communication interface to facilitate communication with the wireless device 110. The communication interface can be operated by the software and the processor.

Processing node 130 is in communication with the first processing node 120 through communication link 155. Processing node 130 can be any network element capable of communicating with the processing node 120, and comprises similar elements as first processing node 120, to enable to the second processing node 130 to send a search request to and receive search results from the first processing node 120.

Communication links 150 and 155 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between the first processing node 120 and the second processing node 130 which are omitted for clarity, including additional processing nodes, routers, gateways, and physical and/or wireless data links for carrying data among the various network elements.

During operation, communication system 100 enables the search of content stored on the wireless device 110. The first processing node 120 receives a search request from the second processing node 130 to search data which is stored on the wireless device 110. The first processing node 120 performs a search of the data stored on the wireless device 110 and generates search results and provides the search results to the second processing node 130. A selection can be made from among the provided search results, and data corresponding to the selected search result can be retrieved from the wireless device 110.

Figure 2:
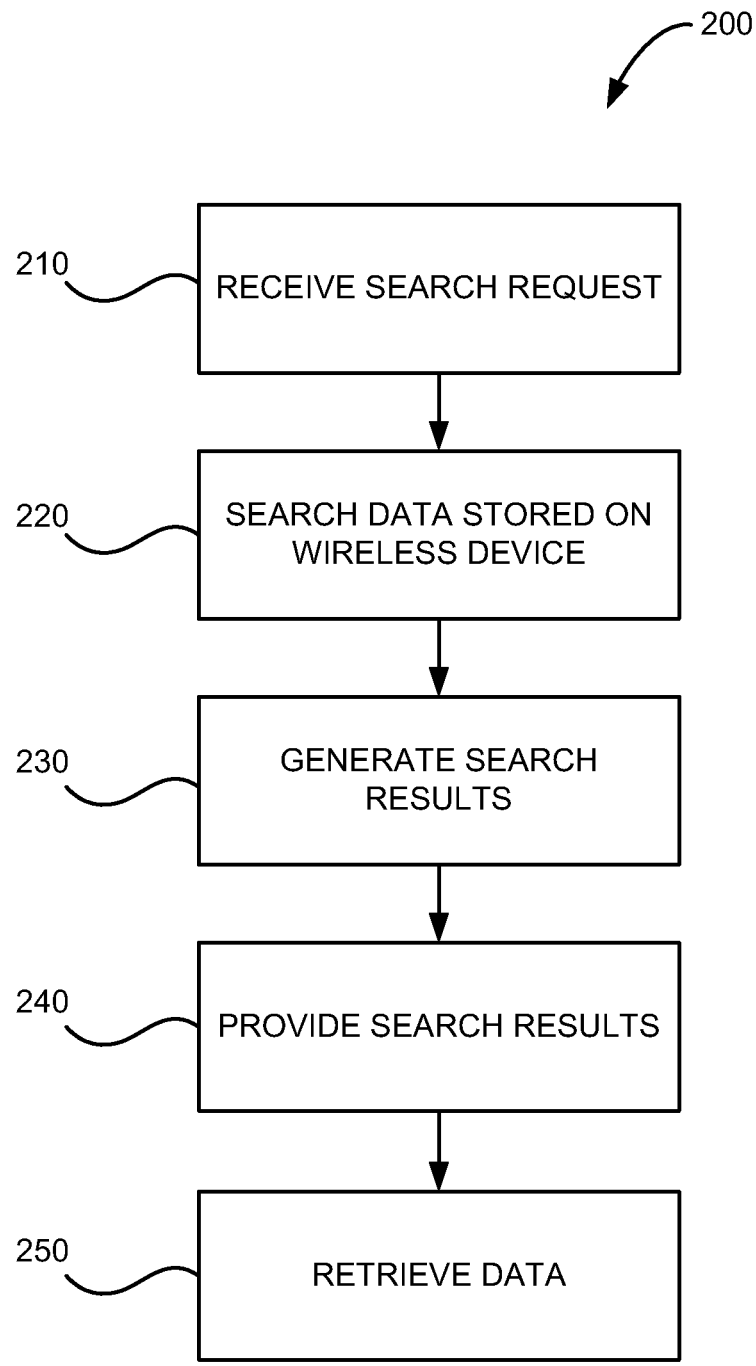
FIG. 2 illustrates an exemplary method of searching data stored on a wireless device.

FIG. 2 illustrates an exemplary method of searching data stored on a wireless device. A search request is received at the first processing node 120 from the second processing node 130 to search data which is stored on the wireless device 110 (operation 210). The search request may be generated by a user, or it may be generated automatically as a result of a process such as a computing process. The first processing node 120 serves as an intermediary between the second processing node 130 and the wireless device 110, and so the first processing node 120 performs a search of the data stored on the wireless device 110 (operation 220). The interposition of the first processing node 120 between the second processing node 130 and the wireless device 110 permits the control of access to the wireless device 110 and to the network resources which enable communication between the wireless device 110 and the first processing node 120. By mediating the search of data stored on the wireless device 110, network resources such as air interface resources, network bandwidth, and processor load of network elements can be conserved. Furthermore, mediating the search of the wireless device 110 reduces the processing load and battery drain of the wireless device 110.

Based on the search of the data of wireless device 110, the first processing node 120 generates search results (operation 230). The search results can be some representation of the data stored on the wireless device 110, typically text and/or images, which relates to the search request. The search results are generated in one or more forms which enable their transmission. The first processing node 120 then provides the generated search results to the second processing node (operation 240). The provided search results may be processed and/or formatted by the second processing node 130, for example, for presentation to a user or for return to a process or system which generated the search request. A selection can be made from among the provided search results, and data corresponding to the selected search result can be retrieved from the wireless device 110 (operation 250). For example, the selection from the search results can be communicated from the second processing node 130 to the first processing node 120, and the first processing node 120 can retrieve the selected data from the wireless device 110, or the first processing node 120 can send a request or a command to the wireless device 110 to provide the selected data to the first processing node 120. The selected data can then be provided by the first processing node 120 to the second processing node 130.

Figure 3:
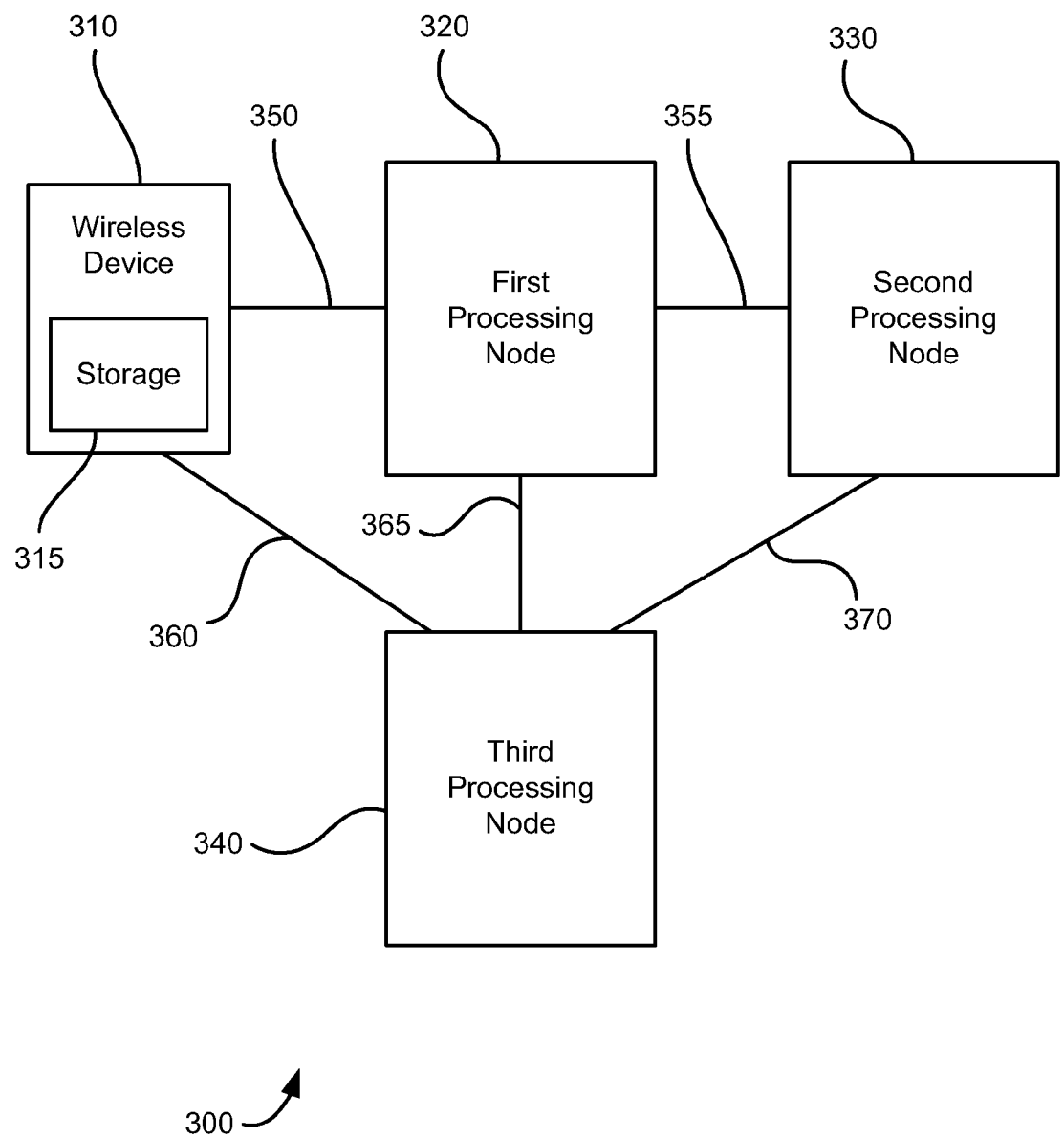
FIG. 3 illustrates another exemplary communication system to search data stored on a wireless device.

FIG. 3 illustrates another exemplary communication system 300 to search data stored on a wireless device. Communication system 300 comprises wireless device 310, a first processing node 320, a second processing node 330, and a third processing node 340. The wireless device 310 and the first and second processing nodes 320 and 330 are similar to the wireless device 110 and first and second processing nodes 120 and 130 illustrated in FIG. 1. Third processing node 340 can be any network element capable of communicating with wireless device 310, first processing node 320, and second processing node 330 through communications links 360, 365 and 370, respectively. Communication links 360, 365 and 370 can be wired or wireless communication links, similar to the communication links described above with respect to FIG. 1. Third processing node 340 can retrieve and store a copy of data stored in the wireless device 310.

In another embodiment and referring back to FIG. 2, in operation 250 where data of the wireless device is retrieved based on a selection made from among provided search results, data corresponding to the selected search result can be retrieved from the copy of the data stored in the third processing node 340. The data can be retrieved from the third processing node 340 by the first processing node 320, or by the second processing node 330. In addition, the wireless device 310 may provide an indication to the first processing node that a copy of its stored data has been stored in the third processing node 340, thereby directing the first processing node 320 or the second processing node 330 to retrieve the data from the third processing node 340. The use of third processing node 340 to store a copy of the data of wireless device 310 conserves network resources such as air interface resources, network bandwidth, and processor load of network elements, and reduces the drain on the wireless device battery. The third processing node 340 can also store an index based on a search of the data stored on the wireless device 310, as further described below.

The description below refers to the exemplary communication system 300 illustrated in FIG. 3, however this is not intended as a limitation. For example, the presence and/or use of the third processing node 340 is not required, and illustrates one possible implementation of a communication system.

Figure 4:
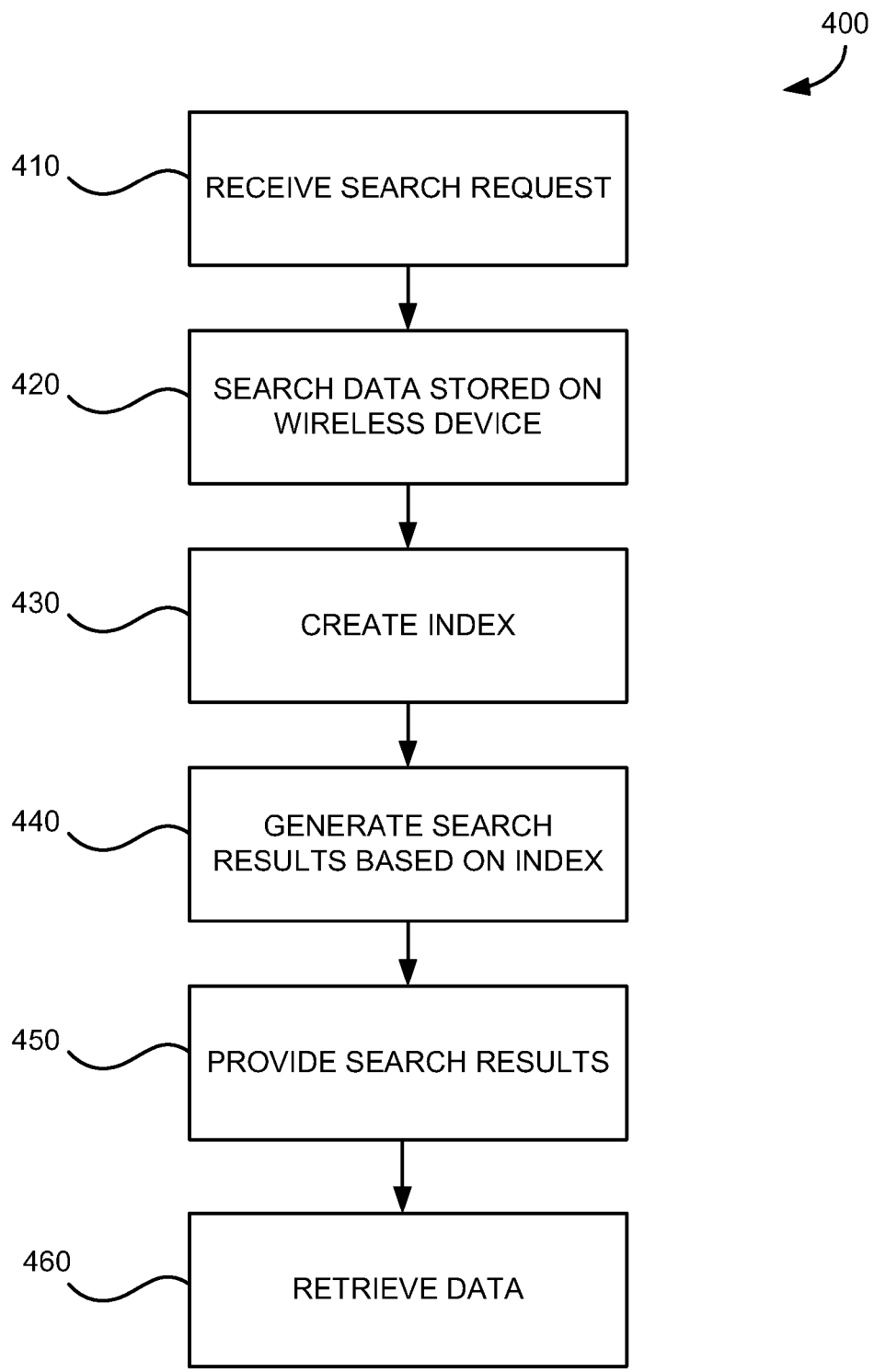
FIG. 4 illustrates another exemplary method of searching data stored on a wireless device.

FIG. 4 illustrates another exemplary method of searching data stored on a wireless device. A search request is received at the first processing node 320 to search data which is stored on the wireless device 310 (operation 410). Based on the received search request, the first processing node 320 performs a search of the data stored on the wireless device 310 (operation 420). Based on the search of the data of wireless device 310, the first processing node 320 creates an index of the data stored on the wireless device 310 (operation 430). The index is a representation of the data stored on the wireless device 310, and can be an abstraction or a summary of the data stored on the wireless device 310. The index can be stored in the first processing node 320, or it can be stored in the third processing node 340 and accessed as needed. Using the search request received from the second processing node 330, the first processing node 320 generates search results based on the created index of the data stored on the wireless device 310 (operation 440).

A selection can be made from among the provided search results, and data corresponding to the selected search result can be retrieved from the wireless device 310 or from a copy of the wireless device data stored on third processing node 340 (operation 460). For example, the selection from the search results can be communicated from the second processing node 330 to the first processing node 320, and the first processing node 320 can retrieve the selected data from the wireless device 310 or from a copy of the wireless device data stored on the third processing node 340. Similarly, the second processing node 330 can retrieve the selected data from a copy of the wireless device data stored on the third processing node 340.

Figure 5:
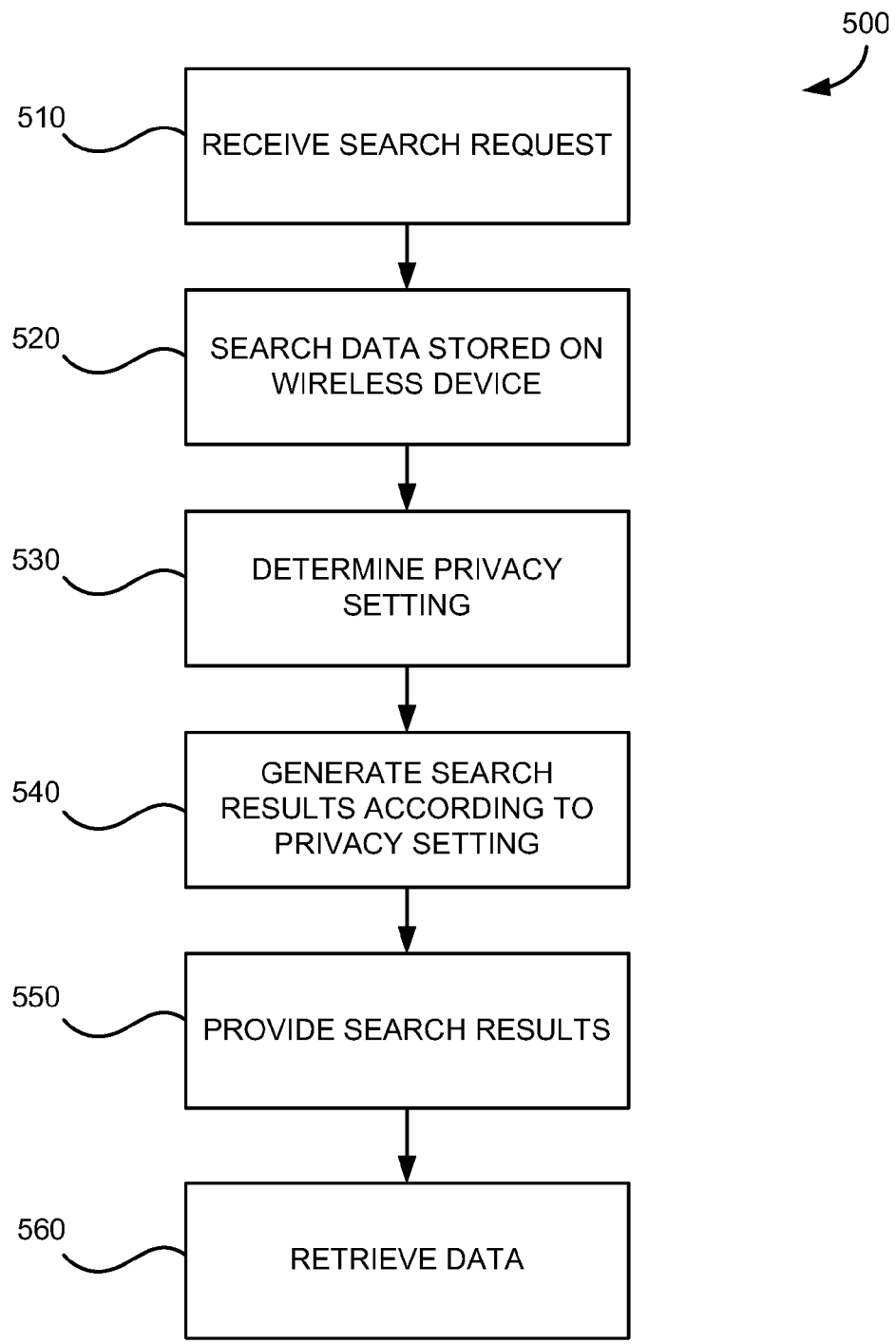
FIG. 5 illustrates another exemplary method of searching data stored on a wireless device.

FIG. 5 illustrates another exemplary method of searching data stored on a wireless device. A search request is received to search data which is stored on the wireless device 310 (operation 510). Based on the received search request, the first processing node 320 performs a search of the data stored on the wireless device 310 (operation 520). Next, in operation 530, a privacy setting of the wireless device 310 is determined. The privacy setting can be stored in storage 315 of the wireless device 310, or in the first processing node 320 or in the third processing node 340. The privacy setting can be associated with a copy of the wireless device data, or it can be associated with an index of the data of the wireless device 310. The privacy setting can also be stored in another network element with subscriber profile information, such as in a home location register, a visitor location register, or another similar database. The privacy setting enables the limiting of search and/or retrieval to a subset of the data of the wireless device, and can be restrictive or permissive (that is, it can indicate files which cannot be searched/retrieved, or files which can be searched/retrieved). The privacy setting can be applied to individual data files, or to classes or types of data (for example, documents, interpersonal contact data, calendar data, photos, music), or to data of specific software applications (for example, files generated by electronic mail applications, or the interpersonal contact data or calendar data of an application). The privacy setting can also be applied to data logically organized in a specified manner, for example, to all data in a designated "folder" or other logical storage location. Other variations of applying a privacy setting to data of the wireless device are also possible.

When the privacy setting is determined, search results are generated using the search request based on the privacy setting (operation 540). The search results thus reflect data stored on the wireless device 310 which is not restricted or which is affirmatively permitted to be searched and/or retrieved. A selection can be made from among the provided search results, and data corresponding to the selected search result can be retrieved from the wireless device 310 or from the third processing node 340 (operation 560). For example, the selection from the search results can be communicated from the second processing node 330 to the first processing node 320, and the first processing node 320 can retrieve the selected data from the wireless device 310 or from the third processing node 340. Similarly, the second processing node 330 can retrieve the selected data from the third processing node 340.

Figure 6:
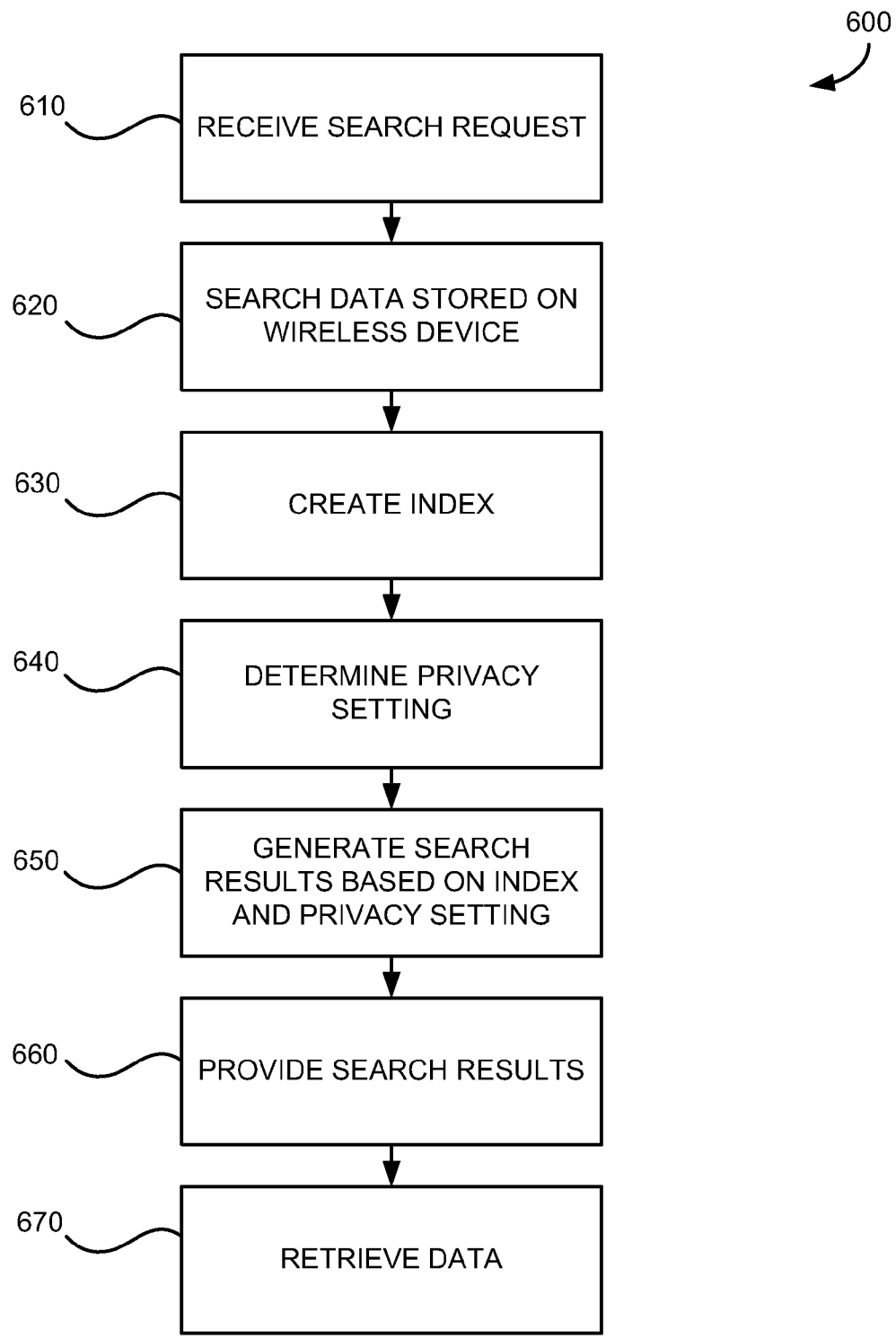
FIG. 6 illustrates another exemplary method of searching data stored on a wireless device.

FIG. 6 illustrates another exemplary method of searching data stored on a wireless device. A search request is received to search data which is stored on the wireless device 310 (operation 610). Based on the received search request, the first processing node 320 performs a search of the data stored on the wireless device 310 (operation 620). Based on the search of the data of wireless device 310, the first processing node 320 creates an index of the data stored on the wireless device 310 (operation 630). Next, in operation 640, a privacy setting of the wireless device 310 is determined. Using the search request received from the second processing node 330 and the determined privacy setting, the first processing node 320 generates search results based on the created index of the data stored on the wireless device 310 (operation 650). In other words, the privacy setting is applied to filter the index to generate the search results. The generated search results are provided to the second processing node 330 (operation 660). A selection can be made from among the provided search results, and data corresponding to the selected search result can be retrieved from the wireless device 310 (operation 670). For example, the selection from the search results can be communicated from the second processing node 330 to the first processing node 320, and the first processing node 320 can retrieve the selected data from the wireless device 310 or from the third processing node 340. Similarly, the second processing node 330 can retrieve the selected data from the third processing node 340.

Figure 7:
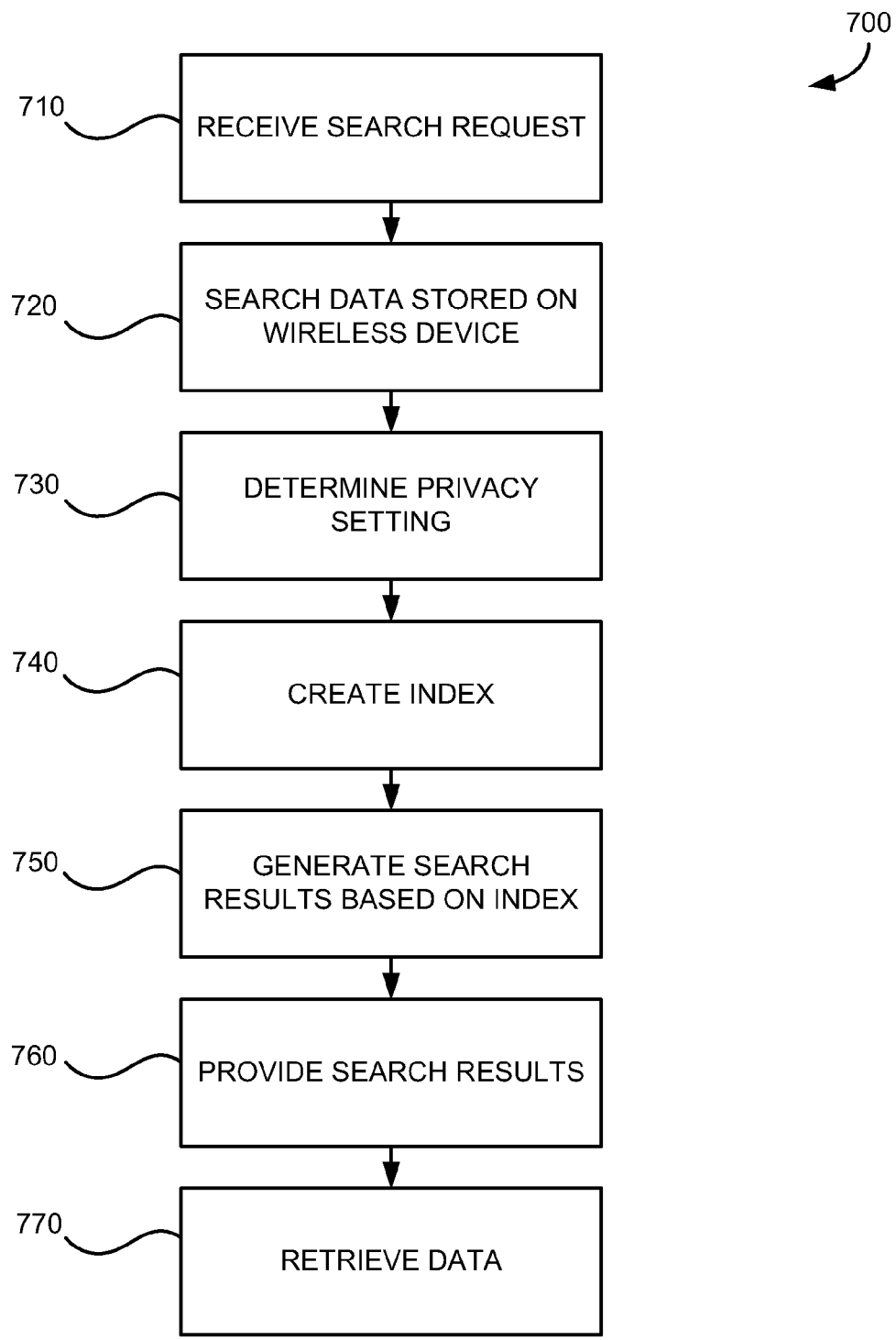
FIG. 7 illustrates another exemplary method of searching data stored on a wireless device.

FIG. 7 illustrates another exemplary method of searching data stored on a wireless device. A search request is received to search data which is stored on the wireless device 310 (operation 710). Based on the received search request, the first processing node 320 performs a search of the data stored on the wireless device 310 (operation 720). In operation 730, a privacy setting of the wireless device 310 is determined. Based on the search of the data of wireless device 310 and the determined privacy setting, the first processing node 320 creates an index of the data stored on the wireless device 310 (operation 740). In other words, the privacy setting is used to filter which data is represented in the index. Then, using the search request received from the second processing node 330, the first processing node 320 generates search results based on the created index of the data stored on the wireless device 310 (operation 750). The generated search results are provided to the second processing node 330 (operation 760). A selection can be made from among the provided search results, and data corresponding to the selected search result can be retrieved from the wireless device 310 (operation 7700). For example, the selection from the search results can be communicated from the second processing node 330 to the first processing node 320, and the first processing node 320 can retrieve the selected data from the wireless device 310 or from the third processing node 340. Similarly, the second processing node 330 can retrieve the selected data from the third processing node 340.

Figure 8:
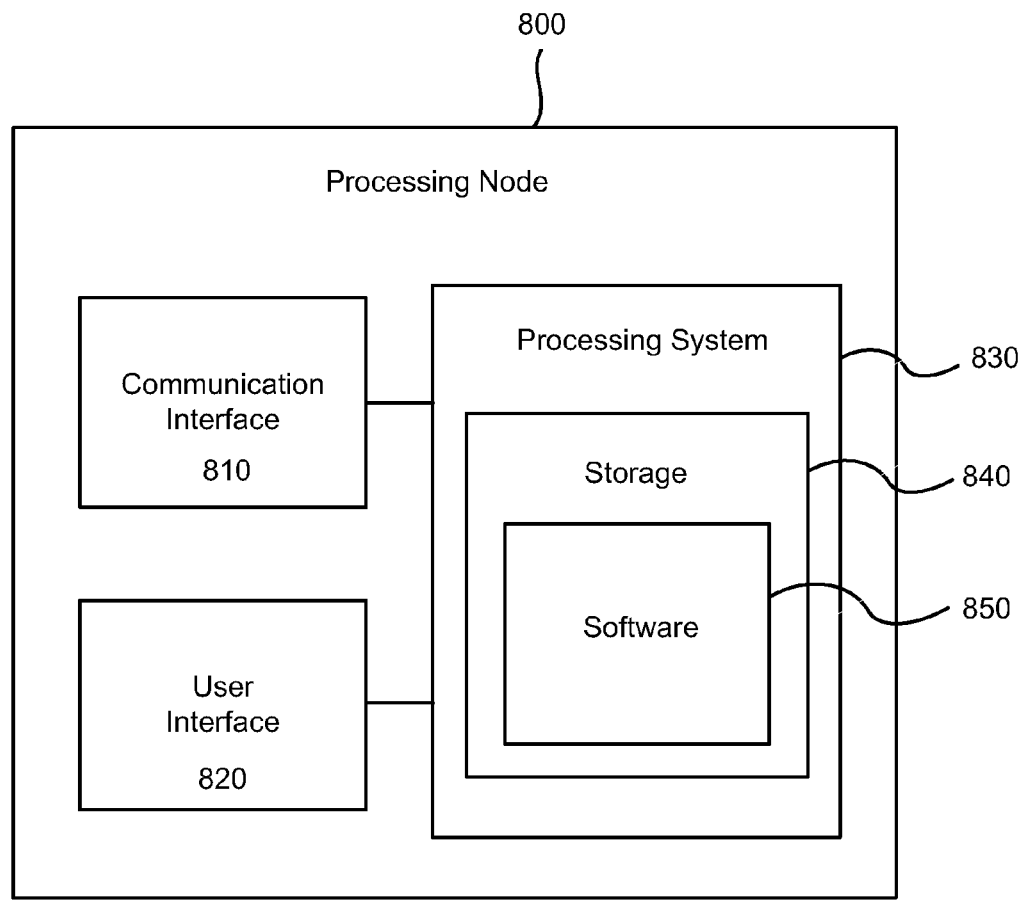
FIG. 8 is a block diagram illustrating an exemplary processing node.

FIG. 8 is a block diagram that illustrates an exemplary processing node 800. Examples of a processing node 800 include first and second processing nodes 120 and 130, and first, second and third processing nodes 320-340. Processing node 800 can include a communication interface 810 and a user interface 820, each in communication with a processing system 830. Processing node 800 can communicate with other network elements, including wireless devices and other processing nodes, over a wired and/or wireless communication link through the communication interface 810. Processing system 830 can include a storage unit 840, comprising a disk drive, flash drive, memory circuitry, or other memory device. Storage unit 840 can store software 850 which is used in the operation of the processing node 800. Software 850 may include an operating system, utilities, drivers, network interfaces, applications, or some other type of software. An exemplary processing node 800 can send or receive a search request, perform a search of data stored, for example, on a wireless device, and can generate search results based on a performed search. An exemplary processing node 800 can also create an index based on the search, determine a privacy setting of a wireless device, and store a copy of data, for example, stored on a wireless device. Processing node 800 can also include a user interface 820 to enable a user to configure and control the operation of the processing node 800.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of searching data stored on a wireless device, comprising the acts of:
   receiving at a first processing node a search request from a second processing node to search data stored on the wireless device, wherein the first processing node is interposed between the second processing node and the wireless device to mediate a search of the data stored on the wireless device;
   performing by the first processing node a search of the data stored on the wireless device in response to the search request;
   creating an index of the data based on the search of the data stored on the wireless device;

generating search results at the first processing node based on a search of the index of the data stored on the wireless device;

providing the search results from the first processing node to the second processing node; and retrieving data of the wireless device based on a selection from the search results provided to the second processing node.

2. The method of claim 1, wherein the search results reflect a subset of the data stored on the wireless device according to a privacy setting.

3. The method of claim 2, wherein the search results reflect data which the privacy setting indicates are allowed to be searched.

4. The method of claim 2, wherein the search results do not reflect data which the privacy setting indicates are not allowed to be searched.

5. The method of claim 1, wherein the data is retrieved from the wireless device.

6. The method of claim 1, wherein the data is retrieved from a third processing node having a copy of the data stored on the wireless device.

7. A method of searching data stored on a wireless device, comprising the acts of:

receiving at a first processing node a search request from a second processing node of data stored on the wireless device, wherein the first processing node is interposed between the second processing node and the wireless device to mediate a search of the data stored on the wireless device;

performing by the first processing node a search of the data stored on the wireless device in response to the search request;

creating an index of the data based on the search of the data stored on the wireless device;

generating search results at the first processing node based on a search of the index of the data stored on the wireless device;

providing the search results from the first processing node to the second processing node; and retrieving data of the wireless device from a third processing node based on a selection from the search results provided to the second processing node, wherein the third processing node has a copy of the data of the wireless device stored thereon.

8. The method of claim 7, wherein the data is retrieved from the third processing node by the first processing node.

9. The method of claim 7, wherein the data is retrieved from the third processing node by the second processing node.

10. A system for searching data stored on a wireless device, comprising:

a processing node configured to:

receive at a first processing node a search request from a second processing node to search data stored on the wireless device, wherein the first processing node is interposed between the second processing node and the wireless device to mediate a search of the data stored on the wireless device;

perform by the first processing node a search of the data stored on the wireless device in response to the search request;

create an index of the data based on the search of the data stored on the wireless device;

generate search results at the first processing node based on a search of the index of the data stored on the wireless device;

provide the search results from the first processing node to the second processing node; and retrieve data of the wireless device based on a selection from the search results provided to the second processing node.

11. The system of claim 10, wherein the search results reflect a subset of the data stored on the wireless device according to a privacy setting.

12. The system of claim 11, wherein the search results reflect data which the privacy setting indicates are allowed to be searched.

13. The system of claim 11, wherein the search results do not reflect data which the privacy setting indicates are not allowed to be searched.

14. The system of claim 10, wherein the data is retrieved from the wireless device.

15. The system of claim 10, wherein the data is retrieved from a third processing node having a copy of the data stored on the wireless device.

* * * * *